METHOD AND APPARATUS FOR THE COMPACTION OF DATA

Filed Jan. 17, 1966 5 Sheets-Sheet 1

CONTROL CIRCUITS
DATA FLOW CIRCUITS

INVENTOR.
DAVID PFUETZE
BY
Fruchbaum and [signature]
ATTORNEYS

METHOD AND APPARATUS FOR THE COMPACTION OF DATA

Filed Jan. 17, 1966

INVENTOR
DAVID PFUETZE
BY
Fishburn and Gold
ATTORNEYS

INVENTOR.
DAVID PFUETZE
BY
Fishburn and Gold
ATTORNEYS

INVENTOR
DAVID PFUETZE
BY
Fishburn and Gold
ATTORNEYS

Nov. 26, 1968 D. PFUETZE 3,413,611

METHOD AND APPARATUS FOR THE COMPACTION OF DATA

Filed Jan. 17, 1966 5 Sheets-Sheet 5

INVENTOR.
DAVID PFUETZE
BY Fishburn and Gold
ATTORNEYS 3,413,611
METHOD AND APPARATUS FOR THE COMPACTION OF DATA David Pfuetze, 1824 Harp Place, Topeka, Kans. 66611

Filed Jan. 17, 1966, Ser. No. 520,929
7 Claims. (Cl. 340—172.5)

ABSTRACT OF THE DISCLOSURE

Groups of bits containing bits which are superfluous for representing desired information are compacted for economical transfer by reference to a key group coded to the essential bit group positions whereby the condition of only the bits in the groups corresponding in position to bits in one condition in the key group is transferred. In unpacking, so as to obtain full groups for further processing, bits are added in positions where the key group bits are in one condition and the sensed condition of the compacted bits is transferred where key group bits are in the other condition.

This invention relates to data transfer and more particularly, to a method and apparatus for the compaction of data in a data storage device, core storage area or for the transmission of data.

Heretofore, computers utilizing a plurality of bits to represent a particular piece of data, such as a six-bit character or an eight-bit byte, have stored, transferred and processed a byte, for example, including eight bits, regardless of the necessity of utilizing all eight bits to uniquely represent a particular byte of information. If the byte is uniquely identified by the first bit, the present day methods and apparatus for data processing still maintain the remaining seven bits with the single significant bit in storage and transfer same to the work or processing area even though the last seven of the eight bits are superfluous. The storage of such superfluous bits are costly both in terms of storage space and operating time.

In regard to operating time, the central processor or work area is normally delayed until the data to be processed is moved from the storage device into the processing unit or work area. The transfer of this data from a storage device, such as magnetic tape, to the processing unit depends upon mechanical devices which generally operate in terms of milliseconds whereas the central processing unit is electronic in nature and capable of operation in micro-seconds and even in nano-seconds. It may readily be seen that the capability and effectiveness of the central processing unit are severely restricted due to the long delay in moving the required data between the storage device and the processing unit. Considerable time is also expended in the transfer of data over telephone lines which is extremely slow transmission in a data processing sense. The transfer of superfluous bits in addition to critical bits merely lengthens the required transmission or transfer time.

It is further noted that storage space within or without of a computer system is always in short supply, as it is heretofore been necessary to store, for example, all eight bits of a byte of information which, in some instances, amounts to a complete waste of seven spaces of storage area.

The principal objects of this invention are: to provide a method and apparatus for the compaction of data which will alleviate the aforementioned difficulties in the art by eliminating or masking out those bits of a particular piece of data not necessary to uniquely represent the particular information; to provide such a method and apparatus which will appreciably reduce the quantity of data storage space required; to provide such a method and apparatus which will appreciably reduce the time required for transferring data from an input-output device to the computer by reducing the amount of data or number of bits required to be stored on the input-output device in order to uniquely represent the data; to provide such a method and apparatus for the compaction of data in a data processing computer system which will compact a particular set of data for transfer of said data to a core storage area, a storage device or for transmission of said data by radio, telephone lines or the like and unpack said data for utilization of said data; to provide such a method and apparatus for the compaction of data which will, in response to a data key, mask out superfluous bits of data at one point to allow for the transmission of the critical bits to a second point and unpack said data at said second point by filling in said superfluous bits; to provide such a method and apparatus including a data key which is developed for a particular set of data which may or may not contain a plurality of repetitive units, records or blocks, the data key being placed in the computer system by setting certain identifying means which represent critical and superfluous bits in the set of data in different conditions which may be distinguished by sensing means, and in the packing operation, only transferring critical bits or those necessary to uniquely identify the piece of data in the data set as indicated by the data key to the storage area, storage device or over transmission lines and when the data is unpacked, the superfluous bits as indicated by the data key are filled into the set of data as said compacted set is transferred from said storage area, storage device or transmission line; to provide such a method and apparatus which will pack and unpack data to be transferred between two points by such means as radio transmission or telephone lines in order to reduce the amount of data which it is necessary to transmit, thereby decreasing the required transmission time; to provide such a method and apparatus which will reduce the cost of data processing, data handling and transmisison by effecting savings in storage space, operating or running time and data transmission time.

Other objects and advantages of this invention will become apparent from the following description taken in connection with the accompanying drawings wherein are set forth by way of illustration and example certain embodiments of this invention.

Figure 1:
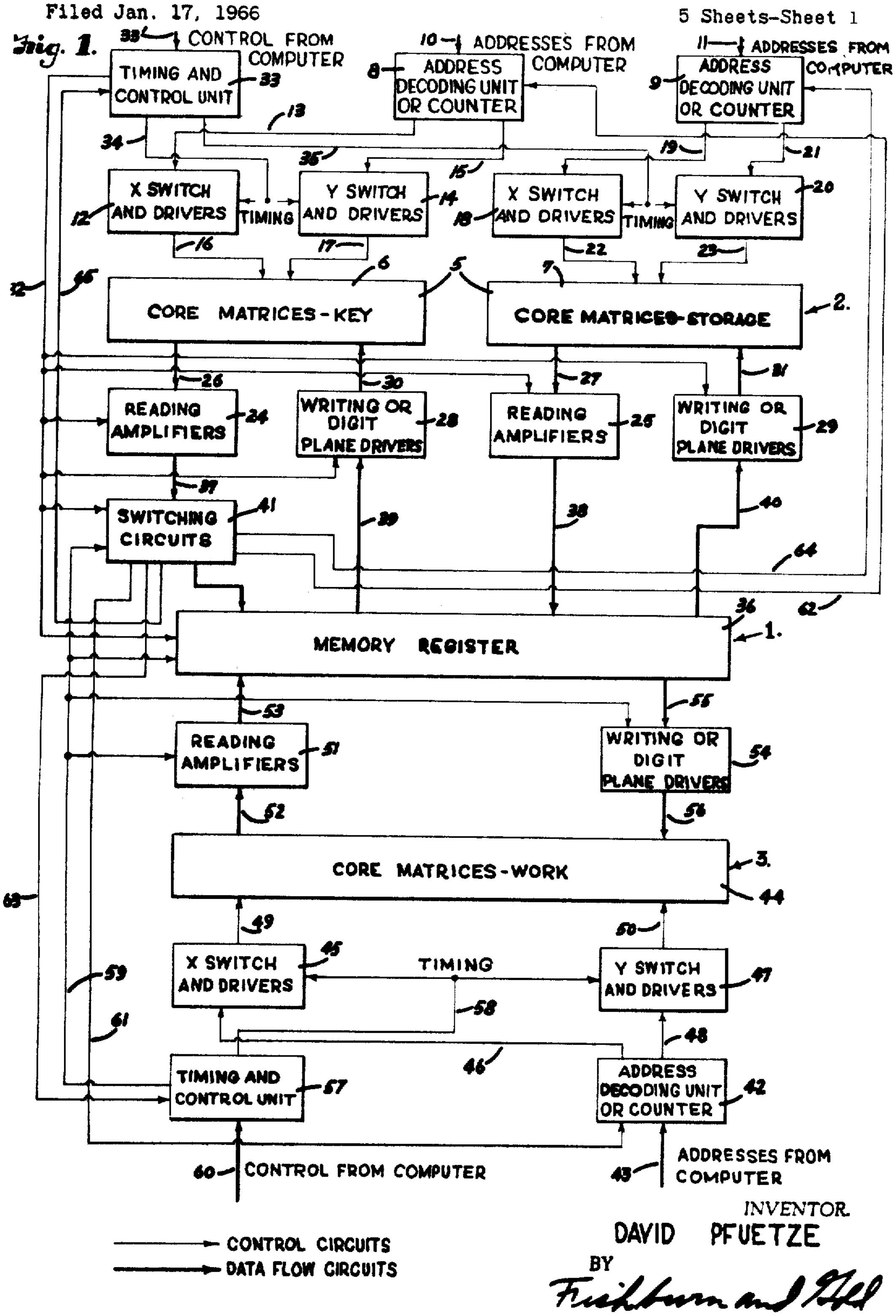
FIG. 1 is a block diagram of one embodiment of a data packing and unpacking device as utilized in a computer or data transfer system.

This invention contemplates the packing of data or the removal of superfluous bits of data, those bits not necessary to uniquely represent a particular piece of data, prior to the transfer of the data to a storage device or over a transmission means, a bit being a representation of a data retaining and identifying means in a data processing or data transfer system. The method of packing data may be utilized regardless of the type of storage device employed in the particular computer system or the type of transmission system over which the data is to be conveyed. The invention further contemplates the forming of a data key comprised of a plurality of bits which correspond to a plurality of bits in a particular set of data. A data set is utilized to designate any grouping of data for which a data key is to be developed. The data set may have blocks, records, units or the like within it which are repetitive and in such a case, the data key need only be established for each repetitive unit, record, block or the like and may be utilized over and over in compacting the data set. In such an instance, the savings in the data storage space will be considerable as the key will be only a fraction of the length of the data set and will occupy very little space in relation to the uncompacted set of data. In other situations, the data key may be the same length in bits as the data set. Such a situation may exist where a data set does not contain repetitive units, but it is desirable to reduce the size of the data set to decrease the time required for transmitting or transferring the data set. The data key is then placed in a first area in a computer data transfer system with the bits of the data key representing those bits in the set of data which are significant or critical to uniquely represent the particular piece of data placed in one physical state, position or condition and those bits in the data key representing the bits in the set of data which are superfluous or not necessary to uniquely represent a particular piece of data being set in an opposite physical state. Where magnetic cores are utilized as identifying means, the cores of the data key representing significant or critical bits may be placed in either an "on" or "off" position with the cores representing the superfluous bits placed in a position opposite that utilized for the critical or significant bits. Superfluous bits in the data set may be either in an "on" or "off" condition. Each bit or core in the data key is then sensed by a sensing means to determine its position, condition or physical state. Then, in response to the signal from the core or bit sensng means or device, the data from the data set in a second area in said system is then transferred to a third area in said system such as a storage device if it is of a critical or significant nature as indicated by the sensing operation and if of a superfluous nature, its transfer to the third area is prevented.

This invention further contemplates the unpacking of the set of data from the third area or storage device by again sensing the data key and transferring a bit from the third area or storage device to a second area such as a work or processing area, an intermediate buffer storage or a memory register unit only when the bit in the data key is sensed as a significant or critical bit. For the purpose of explanation within this specification, the work or processing area is considered to be any area within a computer system where data is placed for access thereto by the processing components of the system. As the processing components are designed to handle data in the uncompacted or normal state, a compacted set of data is unpacked in its transfer to the so-called work area. It may also be desirable to compact the data in its transfer between input-output computer devices, for instance, when an intermediate transmission over telephone lines is to occur, a separate piece of hardware termed a control apparatus may be utilized at each of the transmission lines to pack and unpack the data before and after transmission respectively. Such a control apparatus can be interposed between any two areas of data placement or storage in a computer system to compact the data during its transfer between the respective areas. When a superfluous bit is sensed in the data key, either an "on" or an "off" filler bit is established in the second or work area. Before commencement of the unpacking operation, a determination is made whether to fill with "on" or "off" bits depending upon whether the superfluous bits in the original set of data were "on" or "off." It may readily be seen from this brief description that by sensing of the data key, the superfluous data may be moved into and out from the particular set of data as is desired to reduce the set of data for storage and transmission and to complete the set of data for processing of various types in a work or central process unit of a computer system.

Figures 3, 4, 5:
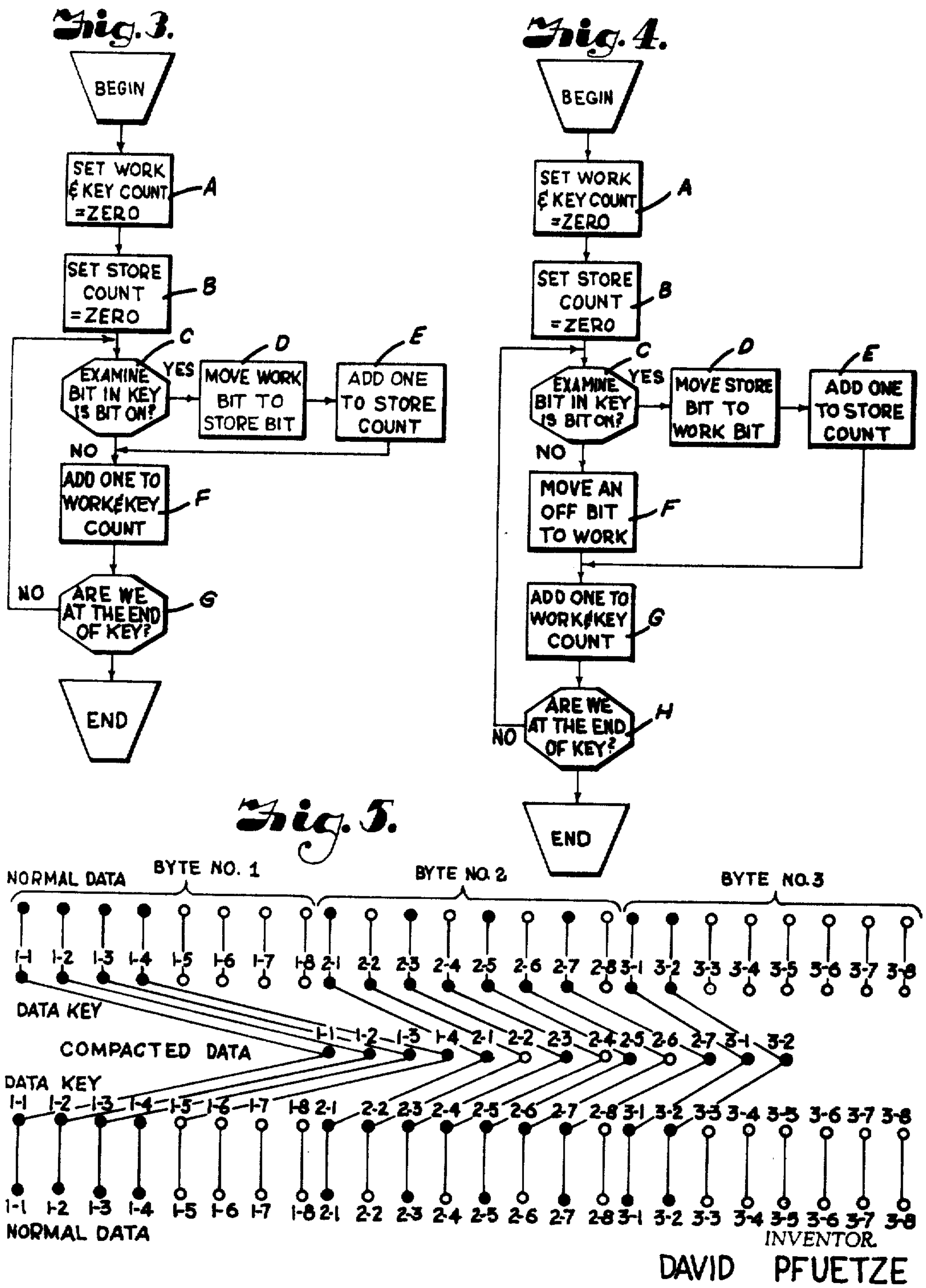
FIG. 3 is a block diagram showing the logic design of the packing device.
FIG. 4 is a block diagram showing the logic design of the unpacking device.
FIG. 5 is a diagrammatic view of a plurality of bytes of data illustrating the compression of said data when the data packing and unpacking devices are utilized.

Referring to the drawings in more detail:

In the normal business data processing operation, various sets of data are maintained and employed on which various processing steps may be applied. For example, a business concern may record and maintain a set of data which sets forth various characteristics of a particular customer. Referring to FIG. 5 of the drawings, such a set of data is shown wherein the data of byte 1 might be utilized to show source of the customer; byte 2, location by city; byte 3, billing cycle data. It should be noted that in each of the bytes illustrated, only a portion of the individual bits are utilized and are significant in uniquely representing the piece of data stored in the particular byte. One may then determine, for example, in regard to byte 1, source of customer, that the first four bits provide a sufficient number of combinations to cover all of the possible customer sources; therefore, the remaining four bits are superfluous and will never be utilized to distinguish a particular customer source. A data key may then be established, as shown in line 2 of FIG. 5, by designating the critical bits in the set of data, shown in line 1, by bits in the data key which are maintained in an opposite physical state from those bits in the data key which represent superfluous bits in the set of data. For example, as shown in FIG. 5, the critical bits are illustrated in an "on" position or state by blackened circles, whereas the superfluous bits are indicated in an "off" position or state by light circles. The "on" state in this embodiment refers to an individual core which would, when properly energized and sensed, emit a signal due to a shift in the direction of the flux lines in that particular core. There is no reason, however, why the critical bits could not be represented in the data key in an "off" position with the superfluous bits represented in an "on" position or any other positions as long as the sensing device can distinguish between the two positions.

When the data key is then sensed to determine the state or position of the particular bits in the data key, only those bits significant or critical to uniquely represent a particular piece of data are transferred to the storage device. Line 3 of FIG. 5 illustrates the result of compressing or packing data in this manner. In the illustrated example, the number of bytes in the normal set of data are compacted to approximately one-half the number shown in the normal set of data and from this, the storage space required to store this data is likewise reduced by approximately one-half. With the compressed data now in the storage device, when the operator desires to move the compressed data to the work or processing unit, the data may be uncompacted by again sensing the data key in the computer and transferring from the storage area to the work area a particular bit when that bit is indicated as being critical or significant by the data key. When the bit is indicated by the data key to be superfluous, the transfer of a bit from data storage is prevented and the computer merely moves to the next address in the work area leaving an "off" bit at the previous address in this embodiment. In line 5, therefore, the compacted data of line 3 has been unpacked and has returned to the normal set of data which may now be processed in the work area of the computer system.

Figure 2:
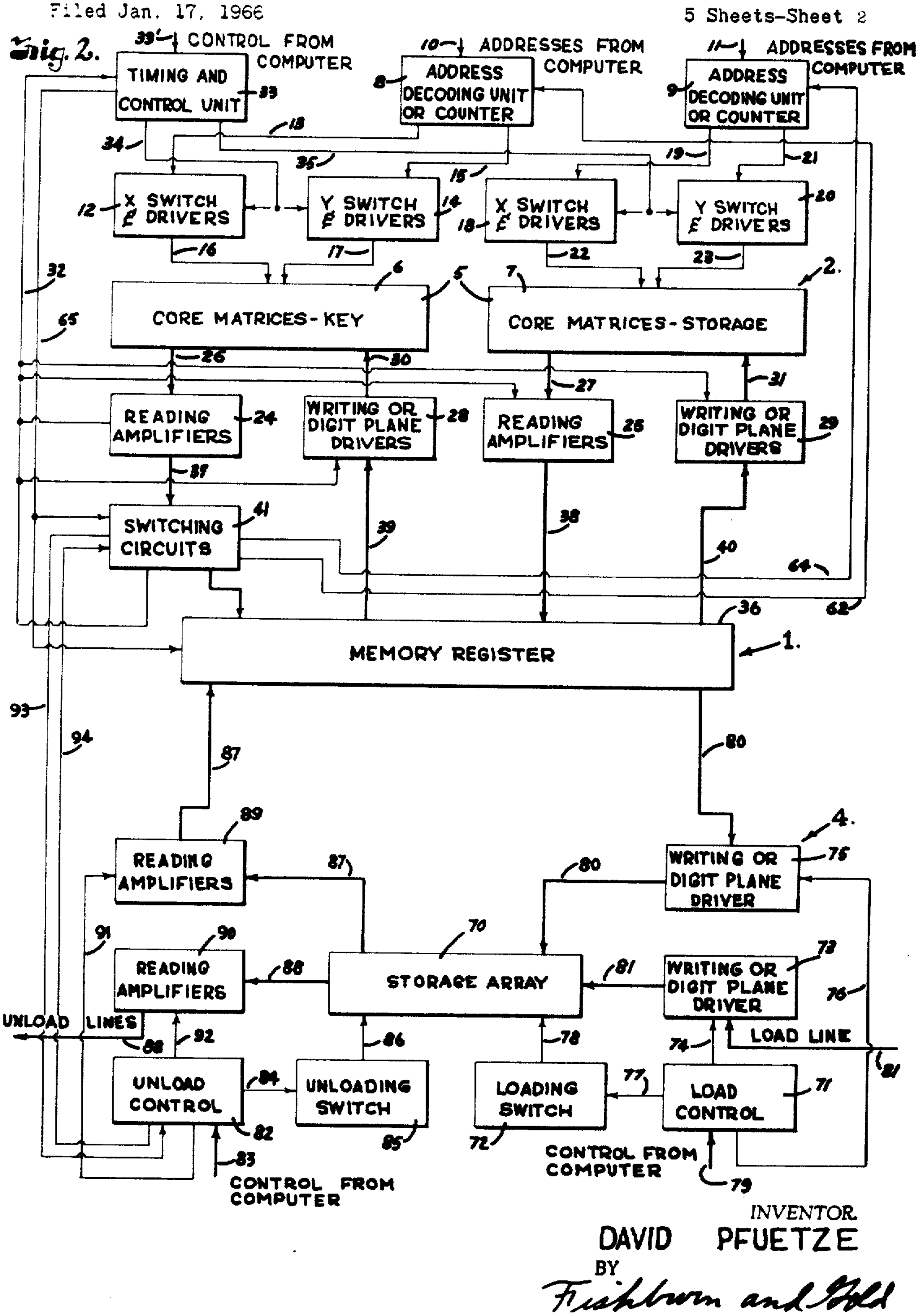
FIG. 2 is a block diagram of a second embodiment of a data packing and unpacking device as utilized in a computer or data transfer system in relation to an input-output device.

Referring to FIGS. 1 and 2, a data transfer system embodying the features of this invention has been shown and is generally designated by the reference numeral 1. For the purpose of this application, a data processing system includes various computer components such as input-output devices, storage devices and core storage areas which are required to process data including a data transfer system or transmission system for transferring the data between the components regardless of the nature of the components and the proximity of their location. In FIG. 1, the relationship and interconnection between a storage area 2 and a work area 3 is generally shown. In order to simplify the drawings and make them more readily understandable, FIG. 2 separately shows the relationship and interconnection between the storage area 2 and the input-output device 4. The data is maintained in the various areas on a plurality of data retaining and identifying means, here illustrated as saturable magnetic cores preferably of a magnetically permeable material interconnected by drive and sense windings of a conventional nature, each of the particular cores representing a bit of a respective piece of data.

Referring to FIG. 1, the storage area 2 is generally comprised of core matrices 5 which are illustrated as being comprised of data key core matrices 6 and data storage core matrices 7. The storage area 2 is illustrated as having a pair of address decoding units or counters 8 and 9 of a conventional nature which receive core addresses from the instruction block of the computer by means of control circuits 10 and 11 respectively. The address decoding unit or counter 8 is operatively connected to X switch and current drivers 12 by means of a control circuit 13 and to Y switch and current drivers 14 by means of a control circuit 15. The X and Y switches and drivers 12 and 14 are, in turn, operatively connected to the data key core matrices 6 by means of control circuits 16 and 17 respectively.

The address decoding unit or counter 9 is also connected to the X switch and drivers 18 by means of a control circuit 19 and the Y switch and drivers 20 by means of a control circuit 21. The X and Y switches and drivers 18 and 20 are, in turn, operatively connected to the storage core matrices 7 by means of control circuits 22 and 23 respectively.

The data key core matrices 6 and the storage core matrices 7 each contains a plurality of data sensing devices illustrated as reading amplifiers 24 and 25, respectively, operatively connected to the individual cores of the core matrices 6 and 7 by means of data flow circuits 26 and 27 respectively, said circuits 26 and 27 including sense windings in the individual cores. The reading amplifiers 24 and 25 are utilized in a conventional manner to read or sense the physical condition of the identifying means or state of magnetization of the individual cores in the core matrices 6 and 7 when said cores are driven by the current drivers 12, 14, 18 and 20.

The storage area 2 also contains a plurality of writing or digit plane drivers of a conventional nature, one set of said drivers 28 being utilized in relation to the core matrices 6 and a second set of drivers 29 being utilized in relation to the core matrices 7, with a pair of data flow circuits 30 and 31 respectively interconnecting drivers 28 and 29 with the respective core matrices 6 and 7. The reading amplifiers 24 and 25 and the drivers 28 and 29 are each timed and controlled by means of a control circuit 32 which interconnects a timing and control unit 33 with said reading amplifiers 24 and 25 and said drivers 28 and 29. The timing and control unit 33 is, in turn, controlled by the instruction block of the computer through control circuit 33'. In addition, the timing and control unit 33 is utilized to time and control the operation of the X and Y switches and drivers 12, 14, 18 and 20 by means of control circuits 34 and 35 respectively.

The reading amplifiers 24 and 25 each conveys a signal to a memory register 36 by means of data flow circuits 37 and 38 respectively. The digit plane drivers 28 and 29 are activated by the memory register 36 and receive data from said register 36 on data flow circuits 39 and 40 respectively. The memory register 36 is of a conventional nature. The memory register 36 controls the rewrite action during the read cycle from the storage area 2 and also controls the write action in storage area 2 upon receipt of data from the work area 3 or from a data input device 4. The memory register 36 is controlled by the timing and control unit 33 by means of the control circuit 32 in order to coordinate the operation of the memory register 36 with the other components of the storage area 2. The data may be transferred through the memory register 36 in a bit by bit basis or the individual bits may be stored until a plurality are contained in the memory register 36 which are then passed en masse to a second area in the system 1. In the illustrated embodiment, the bits are individually transferred through register 36 to the second area. In the method described in relation to FIGS. 6 and 7, thirty-two bits are stored in a register before passing said bits to the second area in the data processing system.

A switching circuit 41 is interposed in the data flow circuit 37 from the reading amplifier 24 to the memory register 36. The switching circuits 41 serve to control the flow of data between the storage area 2 and the work area 3 in accordance with signals received from the data key stored in the data key core matrices 6. Its exact operation will be considered later in a description of the overall operation of the data system 1.

The work area 3, as illustrated in FIG. 1, shows only those circuits necessary for the transfer of data to and from the storage area 2 and has not taken into account the various circuits required for the processing of the data once it is received within the work area 3. The various components within the work area 3 are similar to those discussed in regard to the storage area 2 and operate in the same manner to transfer data to and from the work area 3. An address decoding unit or counter 42 receives addresses from the instruction block of the computer by means of a control circuit 43 for the various addresses within work core matrices 44. The work core matrices 44 are comprised of a plurality of individual magnetic cores of the type discussed in relation to core matrices 6 and 7, said cores being interconnected by a plurality of X and Y drive windings and sense windings in a conventional manner. The address decoding unit or counter 42 is operatively connected to X switch and drivers 45 by means of a control circuit 48, said drivers 45 and 47 being operatively connected to the individual cores of the work core matrices 44 by means of control circuits 49 and 50 respectively.

When the address decoding unit or counter 42 receives a particular wave form on control circuit 43 from the instruction block of the computer, it activates the X switch and drivers 45 and the Y switch and drivers 47 to energize a particular core within the work core matrices 44. If that core is in an "on" position, the driving current from drivers 45 and 47 will reverse the lines of flux in said core, thereby emitting a signal to a reading amplifier 51 on a data flow circuit 52. The reading amplifier 51 then amplifies and conveys a signal on data flow circuit 53 to the memory register 36 where the data can be then conveyed into the storage core matrices 7 or to another data storage device. The work area 3 also contains a plurality of writing or digit plane drivers 54 which receive signals from the memory register 36 on data flow circuit 55 and convey said signals to the work core matrices 44 through a data flow circuit 56 in a conventional manner. The various components of the storage area 3 have their operations timed and controlled by a timing and control unit 57 which controls the X and Y switches and drivers 45 and 47 by means of a control and timing circuit 58 and the reading amplifiers 51, digit plane drivers 54 and the memory register 36 by means of a control circuit 59. The timing and control unit 57 is, in turn, controlled by the instruction block of the computer through control circuits 60.

As previously discussed, a data key is established for a particular set of data and said key is entered into the key data core matrices 6 of the storage area 2 with the particular set of data being entered into the storage core matrices 7 in compacted form. Each individual core in the data key core matrices 6 represents a data bit and the data key with a core in the "on" position representing a significant or critical bit which is necessary to uniquely represent a particular byte, character or piece of information in the data set stored in the storage core matrices 7. A core set in an "off" position represents a superfluous bit which will not be conveyed or stored in the storage core matrices 7.

When it is desired to transfer data from the work core matrices 44 to the storage core matrices 7 and to pack said data by removing the superfluous bits from the data set, the individual cores in the data key core matrices 6 will be examined or sensed individually to determine the necessity of transferring a particular bit in the work core matrices 44 to the storage core matrices 7 in order to uniquely represent that piece of data of which the individal bit is a part thereof. In order to accomplish this, an address in the data key core matrices 6 is received by the address decoding unit or counter 8 over countrol circuit 10 from the instruction block. The address decoding unit or counter 8 then activates the X and Y switches and drivers 12 and 14 which, in turn, energize the X and Y windings of the particular core in the data key core matrices 6 which is to be sensed or examined in accordance with the address received from the instruction block.

If the individual core in the data key core matrices 6 is in an "on" position indicating a critical or significant bit, the current drivers 12 and 14 will nitiate a reversal of direction of the flux lines in the particular core, thereby emitting a signal on the sense winding of that core. Said signal is then conveyed through circuit 37 to the switching circuit 41. The switching circuit 41 is operatively connected to the timing and control unit 33 by means of control circuit 32 and to the timing and control unit 57 by means of the control circuit 59 in order to set the switching circuits 41 for a transfer from either storage area 2 to work area 3 or from work area 3 to storage area 2. The switching circuits 41 are also operatively connected to the address decoding unit or counter 42 by control circuit 61.

When a signal is received through circuit 37, the switching circuit 41 by means of a series of relays of a conventional nature conveys a signal to the address decoding unit or counter 42 which indicates that the bit sensed in the data key core matrices 6 is a critical or significant bit and allows the passage of the signal from the address decoding unit or counter 42 to the X and Y switch and drivers 45 and 47 to initiate the transfer of a particular bit from the work core matrices 44 to the memory register 36 and into the storage core matrices 7.

A second control circuit 62 may connect the switching circuit 41 with the address decoding unit or counter 8 to indicate the completion of a reading cycle; however, said circuit 62 may be omitted in computers which would utilize a timed flow of addresses into the address decoding unit or counter 8 which would automatically time the completion of a reading cycle and initiate a second reading cycle without notification of the completion of the first cycle.

Had a signal not been received from the reading amplifiers 24 through circuit 37, the control circuit 61 would not have closed the circuit between the address decoding unit or counter 42 and the X and Y switch and drivers 45 and 47 to initiate a transfer of data from the work area 3 to the storage area 2, as the bit then presently under examination would have been a superfluous bit and one not necessary to uniquely represent the particular piece of data. A signal would have also been initiated through control circuit 63 to the timing and control unit 57 in order to delay the timing and control of the X and Y switch and drivers 45 and 47, as an address from the address decoding unit or counter 42 would not be forthcoming. The address decoding unit or counter 42 would then move to the next address in the work core matrices 44 as dictated from the instruction block of the computer on control circuit 43. A control circuit 64 may be employed to connect the switching circuits 41 to the address decoding unit or counter 9 to signal the completion of a transfer to an address in the storage core matrices 7 and initiate a movement to the next address in said core matrices 7.

Referring to FIG. 3, the logic design of the system 1 shown in FIG. 1 has been shown in diagrammatic form. The procedure commences at step A by setting the data key counter or decoder 8 at zero or at the beginning of the key and setting the address decoding unit or counter 42 at zero or at the beginning of the uncompacted data then stored in the work core matrices 44 and corresponding to the particular key in the key core matrices 6. In step B, the store count or address decoding unit or counter 9 is set at zero or at the first address in the storage core matrices 7 in which the first bit is to be inserted on the transfer of data from the work area 3 to the storage area 2. In step C, a bit in the key is examined, as previously discussed. If the bit in the key is "on" indicating a significant or critical bit in the work core matrices 44, the switching circuit 41 conveys a signal over control circuit 61 and 63 to the address decoding unit or counter 42 and the timing and control unit 57 to close the circuits between said units to activate the X and Y switch and drivers 45 and 47 to commence the operation of examining the corresponding bit in the work core matrices 44. If the bit in the work core matrices 44 is "on," in step D, a signal is transferred to the storage area 2 on data flow circuit 53 and an "on" bit is inserted in the proper address in the storage core matrices 7. If the bit in the work core matrices 44 is "off" or after transfer of an "on" bit to the storage matrices 7, in step E, the storage count is moved to the next address in storage leaving an "off" or "on" bit in the preceding address in a conventional manner. If, however, the bit examined in the key is "off" indicating a superfluous bit in the set of uncompacted data in the work core matrices 44, the control circuits 46, 48 and 58 are not closed to effect an examination of the bit in the work core matrices 44, but rather in step F, the key count is moved to the next address as is also the work count, so that the examination will begin again on the next bit in the data key core matrices 6. In step G, an examination is made to determine if the last bit in the data key has been processed. When the last bit in the data key has been examined, the address decoding unit or counter shifts the examination back to the first bit in the key and initiates the packing routine on the next record of data within the data set. This operation is continued until all of the data in a particular set of data has been compacted and transferred from the work core matrices 44 to the storage core matrices 7 or to any storage device.

With the data set now compacted and stored in the storage core matrices 7, it is necessary to unpack said data set upon the transfer of the data set back to the work core matrices 44 for processing. This unpacking operation is also accomplished by an examination of the data key core matrices 6 with additional steps to fill in those superfluous bits removed during the packing operation. When a bit or core is sensed in the data core key matrices 6 and is found to be in an "on" position indicating a critical or significant bit in the data set, the switching circuit 41 will effect a signal emission on control circuit 62 to the address decoding unit or counter 9 and a signal on a control circuit 65 to the timing and control unit 33. This signal effects a closing of the circuits between units 9 and 33 and the X and Y switch and drivers 18 and 20 in order to effect an examination of the corresponding bit in the storage core matrices 7. If the bit and the storage core matrices 7 are found to be in an "on" position, a signal is emitted along data flow circuit 38 and a bit is transferred to the work core matrices 44 in an "on" position in a conventional manner. If the bit in the storage core matrices 7 is found in an "off" position, the address decoding unit or counter 42 is simply moved to the next address in the work core matrices 44 leaving an "off" bit in the previous address.

When the examination of the data key core matrices 6 finds a bit in the "off" position, the control circuits between the timing and control unit 33 and the address decoding unit or counter 9 and the X and Y switch and drivers 18 and 20 are open, either by actively opening said circuits or by leaving said circuits in an open position depending upon the state in which the circuits are originally set. Unit 42 then moves the X and Y switches 45 and 47 to the next address in the work core matrices leaving an "off" or superfluous bit in the last address in the work core matrices 44. In this manner, the data is then uncompacted and returned to its original or normal form of data comprised of eight bits per byte or six bits per character as the case may be.

Referring to FIG. 4, the logic design of the unpacking operation of the system shown in FIG. 1 is illustrated to generally indicate the basic method of operation of system 1. The method is commenced in steps A and B by setting the address decoding unit or counters 8, 9 and 42 at the first core address in each of the core matrices 6, 7 and 44 which correspond to the first bit in the data key, the data set and the location of the first bit of the data set to be transferred to the work core matrices 44. In step C, the first core or bit in the data key is examined. If this bit is found to be in an "on" position, an examination of the bit in the storage core matrices 7 is affected in step D to institute an establishment of that bit in the work core matrices 44. If the bit is in an "on" position, a signal is transmitted over data flow circuit 38 to the memory register and then through the writing or digit plane drivers 54 for writing on the work core matrices 44 and the storage matrices count moves to the next address in step E. If, however, the bit is in an "off" position, the address decoding unit or counter 42 is moved to the next address in the work core matrices leaving the last address in the work core matrices 44 in an "off" position and the storage matrices count moves to the next address in step E. The address decoding units or counters are then moved to the next address in each of the core matrices 6 and 44 in step G.

If the data key bit in the data key core matrices 6 is found to be "off" indicating a superfluous bit in the data set, a bit is not transferred from the storage area 2 to the work area 3, as the particular bit is not contained in the storage area 2. In effect, what happens in step F is that the address decoding unit or counter 42 simply moves to the next address in the work core matrices 44 leaving an "off," superfluous bit, in the last address, thereby filling in or unpacking the compacted data contained in the storage core matrices 7. The address decoding unit or counter 8 is then activated in step G to move to the next address in the data key core matrices 6 for examination of the next bit in the data key and the next address in the work core matrices is made ready for receipt at the next bit. It should be noted that the address decoding unit or counter 9 is not activated to shift to the next address in the storage core matrices 7 as only critical bits are stored in core matrices 7 and when superfluous bits are placed in the work core matrices, a shift to the next address does not occur in the storage core matrices 7. In step H, an examination is made to determine if the last bit in the key has been examined. When the last bit in the data key has been examined, the address decoding unit or counter 8 will shift the examination back to the first bit in the data key in order to repeat the operation on the next line of data in the data set.

Referring to FIG. 2, the data input-output device 4 is illustrated to show the interconnection between the switching circuit 41 and said input-output device 4. The input-output device 4 as illustrated contains a storage array 70 which is similar in construction to the core matrices 6, 7 and 44 containing a plurality of magnetic cores interconnected by drive and sense windings. A load control 71 and a loading switch 72 are used to both drive the storage array 70 and, operating as address counters, to remember the load address. The load control 71 is operatively connected to writing or digit plane drivers 73 by a control circuit 74 and to a plurality of writing or digit plane drivers 75 by means of a control circuit 76, said drivers 73 and 75 being utilized to load the storage array 70. The load control 71 is operatively connected to the loading switch 75 by means of a control circuit 77 with the loading switch operatively connected to the storage array 70 by means of a control circuit 78. The loading operation of storage array 70 is controlled by a control circuit 79 which connects the load control 71 with the instruction block of the computer. A pair of load lines 80 and 81 have the writing or digit plane drivers 75 and 73 respectively interposed therein and are utilized for data flow into the storage array 70 from either the memory register 36 of storage area 2 or from any number of different types of computer input devices.

The unloading system of storage array 70 operates in a conventional manner having an unload control 82 operatively connected by means of a control circuit 83 to the instruction block of the computer and by a control circuit 84 to an unloading switch 85. The unloading control 82 and unloading switch 85 serve to drive the storage array 70 and remember the unload address. The unloading switch 85 is operatively connected to the storage array 70 by means of a control circuit 86. The storage array 70 is illustrated as having two data flow unload lines 87 and 88, each having a plurality of reading amplifiers 89 and 90 respectively which operate in a conventional manner to sense the physical condition of the individual cores in the storage array 70. The reading amplifiers 89 and 90 are controlled from the unload control 82 by means of control circuits 91 and 92 respectively. The switching circuit 41 is operatively connected to the unload control 82 by means of a pair of control circuits 93 and 94. As was previously described, when a critical bit is sensed in the data key core matrices 6, a signal is emitted through the reading amplifiers 24 to the switching circuits 41. The receipt of this signal in the switching circuit 41 will cause the activation of the control circuit 93 to the unload control 82, thereby initiating an examination of the subject bit of data or the core in the storage array 70 and its subsequent transfer to the data storage core matrices 7. If the superfluous bit is sensed in the data key core matrices 6, the examination by the unload control unit 82 of the subject bit in the storage array 70 will not be initiated nor will the superfluous bit be transferred to the data storage core matrices 7. Instead, the unload control 82 and unload switch 85 will be activated to move to the next address in the storage array 70 and await a signal from the switching circuit 41 to determine the necessity of driving said core address in the storage array 70 or simply moving on to the next core address. In this manner, the set of data corresponding to the data key in the data key core matrices 6 will be transferred from the storage array 70 through the data flow circuit 87 and into the storage area 2 in a compacted state. The unpacking of this data would proceed in the same manner discussed in relation to the apparatus shown in FIG. 1.

The above described apparatus components are commercially available for routine assembly into the novel relationships by those skilled in the art. By way of example, the following components may be found in the EECo-781 Random Access Core Memory (Engineered Electronics Company, Santa Ana, California): address decoding unit or counter 8, 9, 42; X switch and drivers 12, 18, 45; Y switch and drivers, 14, 20, 47; core matrices 6, 7, 44 reading amplifiers 24, 26, 51, 89, 90; writing or digit plane drivers 28, 29, 54, 73, 75; storage array 70;

load and unload controls 71, 82; and loading and unloading switches 72, 85. The timing and control units 33, 57 may be constructed from the following EECo components: IDC–0210 BCD decade counter; ISR–0253 ten bit shift register; IMC–0243 magnitude comparator and INN–0202 NAND gates. The switching circuits 41 may be constructed from the following EECo components: INN–0202 NAND gates; IDS–0246 digital scanner and IFF–0252 J–K flip-flops. The requirements of the memory register 36 are met by the EECo ISR–0253 serial shift register.

Figure 6:
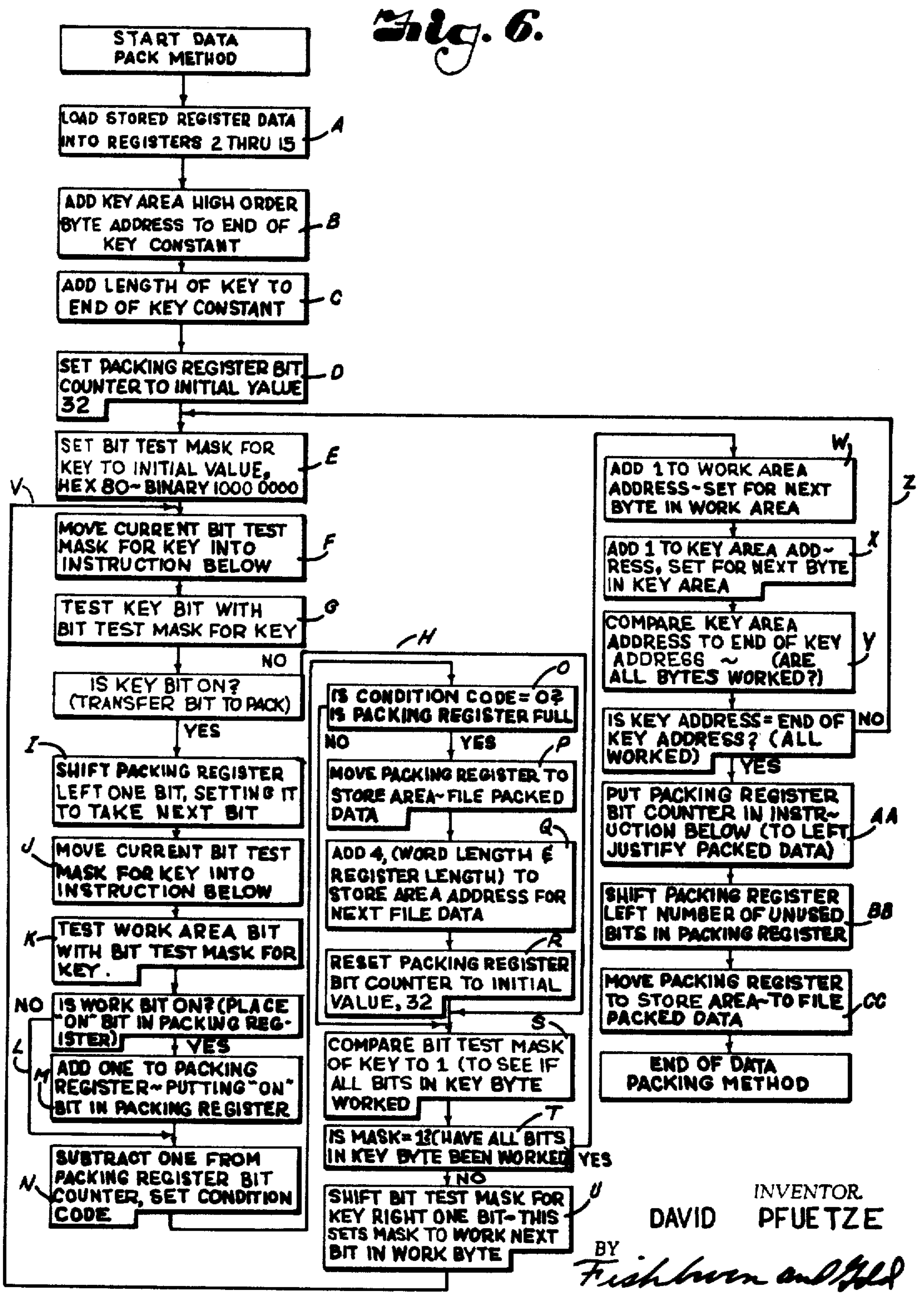
FIG. 6 is a logic block diagram of a data packing method applicable to the IBM 360 computer system illustrating a method of data packing.
Figure 7:
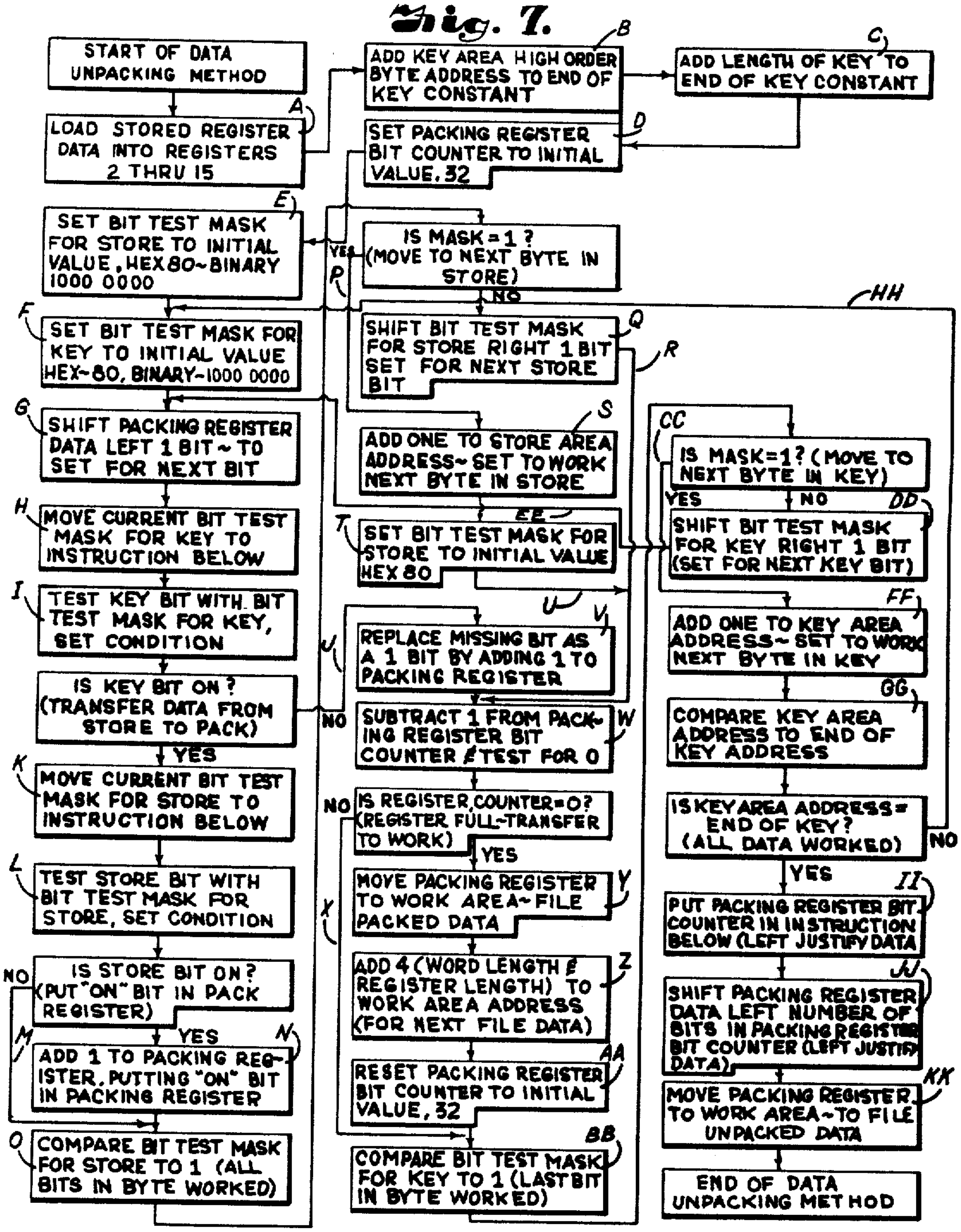
FIG. 7 is a logic block diagram of an unpacking method applicable to the IBM 360 computer system showing a method of data unpacking.

The packing of data by the removal of superfluous bits and the unpacking of said data by the filling of superfluous bits may also be accomplished by the novel method of operation of a computer system set forth in FIGS. 6 and 7 and described in relation to an IBM 360 computer system. Although reference to the IBM 360 computer system has been utilized as an example in describing the method of system operation, the steps followed in so operating this system could also be utilized in operating other and different systems.

TABLE I

*Storage areas for data—These storage areas will be loaded in registers 2 to 15 prior to executing the packing and unpacking methods*

REG02STR DC [1] XL4'00000000' Work Area High Order Byte Address
REG03STR DC [1] XL4'00000000' Key Area High Order Byte Address
REG04STR DC [1] XL4'00000000' Length of Key Area in No. of Bytes
REG05STR DC [1] XL4'00000000' Store Area High Order Byte Address
REG06STR DC XL4'00000000' Address of Last Byte in Key 1/End Key
REG07STR DC XL4'00000000' Packing Register Bit Counter
REG08STR DC XL4'00000020' Constant 32 Decimal to Initialize Reg #7
REG09STR DC XL4'00000000' Bit Test Mask for Key
REG10STR DC XL4'00000080' Constant for Initializing Bit Test Masks
REG11STR DC XL4'00000001' Constant of 1
REG12STR DC XL4'00000000' Packing Register
REG13STR DC XL4'00000004' Constant of 4, for Storing Full Words
REG14STR DC XL4'00000000' Bit Test Mask for Store
REG15STR DC XL4'00000000' Instruction Address Base Register

[1] This information must be furnished by placing it in the labeled core storage areas prior to each packing or unpacking operation.

Referring to FIG. 6, the packing method commences with step A by loading multiple registers 2 through 15 from core storage. As the computer system may have been previously utilized for various purposes prior to beginning the method, it is necessary to set up the registers with the information which is required to conduct the packing method; therefore, in the first step we are bringing information from the core storage and into the basic registers. The basic registers are set forth in Table I which describe their utilization in the data packing and unpacking methods.

In step B, register 3 is to be added to register 6 in order to add the high order or beginning byte address of the key to a register, in this instance, 6 which has a zero value.

In step C, register 4 is added to register 6. It is necessary to add the length of the key area in number of bytes to the address of the first byte in the key plus one to determine the address of the end of the key which will be stored in register 6. As we move through the packing method on a step-by-step basis, we will constantly check the address we are currently working in the key to the end of the key address by means of the action taken in step Z. The end of the key address is computed by steps B and C. Once we have reached the end of the key address, the packing operation will terminate or a second packing operation can commence on a second repetitive unit or portion of the data set.

In step D, it is necessary to load the contents of register 8 into register 7, thereby setting the packing register bit counter to its initial value of 32. By so operating the system, we can retain up to 32 bits in the packing register and as we move through this operation, it is necessary to keep track of how many bits we have loaded into the packing register; therefore, before starting the operation of placing bits into the packing register, we must indicate that no bits have yet been placed into the packing register. This is accomplished by setting a value of 32 into the packing register bit counter. By subtracting one from the bit count register, we can determine how many bits have been placed in the packing register. When the register is full, the bit counter will have a value of zero.

In step E, the contents of register 10 are loaded into register 9. This step is necessary in order to keep track of which bit in a particular byte we are presently working and to do so, it is necessary to establish a bit test mask for the data key. Each time we are ready to work the first bit in a byte in the key, the mask is set at an initial binary value of 1000 0000. This indicates that we are going to work on the first bit in a byte in the data key. As the bit is worked in a particular byte in the data key, the one or "on" bit in the byte shown above moves one place to the right, for example, when 01000000 appears, the second bit is to be worked. The test mask then indicates which bit in a byte is to be worked.

In step F, the contents of register 9 is stored in the second byte of the instruction in step G. The instruction in step G is utilized to examine a bit in the key to determine its condition in either an "on" or "off" state. In order for the instruction to perform properly, we must indicate to it which bit it should work on and this is accomplished in step F by moving the current bit test mask for the data key into the instruction of step G. Step F is then an intermediate step which indicates to the sensing means in the particular system which bit in a byte in the data key is to be sensed or which bit is to be driven.

In step G, we test under mask the data at the storage location indicated in register 3 using the bit test mask loaded into this instruction at step F. In this step, we are testing or sensing a particular bit in a byte at a particular location indicated by the bit test mask to determine whether data in the data set corresponding to that bit in the data key is critical or superfluous. In addition to the test, in step G, it is necessary to set a condition code which will be used for branching in step H. If the bit in the data key byte is found in one or "on" condition, we will move to another step within the method or if found in the opposite or "off" condition, we move to a different step within the method.

In step H, it is necesary to branch on condition code to step S if the bit in the key is in an "off" condition indicating a superfluous bit when it was examined in step G above. When the bit is "off" indicating a superfluous bit, data will not be transferred from the work area to the store area; therefore, steps I through R will not be necessary. If, however, the bit is in an "on" condition indicating a critical or significant bit in the data set, it will be necessary to transfer the data from the work area to the store area and this will be accomplished by moving to step I.

In step I, we shift left logical the data in the packing register 12 one bit. The purpose of this operation is to shift any bits which may have been previously placed in the packing register 12 to the left one position and out of the way of the new bit which we are about to place in the units position of the packing register 12.

In step J, the contents of register 9 are moved to the second byte of the instruction or operation indicated as step K. It is necessary to examine the work area to determine whether to transfer an "on" or "off" bit to the store area and in order to keep track of which bit is currently being worked in a particular byte in the work area, it is necessary to utilize a bit test mask. In this step, we are moving this mask into the operation or instruction of step K. Step J, like step F, is an intermediate step which indicates to the sensing means which bit in the work area is to be driven for the sensing operation.

In step K, the bit in the work area at the byte address indicated in register 2 using the bit test mask for the data key is tested to determine its condition. It should be noted at this point that a unit, record or block in the data set contained in the work area and the data key are identical in nature and length though they might vary in content of data; therefore, a bit test mask utilized for data key may also be utilized for the work area.

In step L, we branch on condition code to step N if the bit in the work area is in an "off" condition thereby omitting step M. If the bit in the work area is in an "off" state or condition, it is not necessary to load an "off" bit into the packing register 12. The original shift left of one bit brought an "off" bit into the units position of the packing register 12, as is desired.

In step M, register 11 is added to register 12 or more specifically, we add an "on" bit to the packing register 12 or energize the bit in the units position of the packing register to an "on" position.

In step N, register 11 is subtracted from register 7. By this step, one is subtracted from the packing register bit counter to reduce the count of the number of unused bits in said packing register 12. In addition to this operation, we will also set a condition code which is to be tested in step O to determine whether or not the packing register has reached a zero condition or is presently full.

In step O, we branch on condition to the instruction labeled step S if the contents of the packing register bit counter are not equal to zero or, in other words, the packing register 12 is not full. If, on the other hand, the packing register 12 is full and the value of the packing register but counter is zero, the contents of the packing register are transferred to the store area in steps P through R by conventional means.

In step P, the contents of the packing register 12 are stored in the storage area of the computer system at the addresses therein beginning at the high order position of said store area. This high order position is contained in register 5. The purpose of this step is to move the four bytes of packed data that has accumulated in the packing register 12 to the storage area at the address in the storage area as indicated by register 5.

In step Q, register 13 is added to register 5. In this step, we add the number of bytes transferred from the packing register 12 to the store area to the address of the store area to obtain the next available positions in the store area for transfer of the contents of the packing register 12 when said register 12 again becomes full.

In step R, the contents of register 8 are loaded into register 7. This step is executed in order to reset the packing register bit counter to its original initial value of 32 for a second sequence of loading of the packing register 12 on a bit-by-bit basis in the manner previously described.

In step S, the register 11 is compared logically to register 9. Register 11 is set at a value of one and register 9 is the bit test mask for the data key. The purpose of this comparison is to determine whether we have worked the final bit in a given byte of the key. If the value of the data key mask is one and thus agrees with the contents of register 11, all of the bits in a particular byte have been worked and it's time to move to the next byte address or to end the operation.

In step T, we branch on a condition to step W if the bit test mask for the data key is equal to one. If the bit test mask for data key is equal to one, we then move to a series of steps which will move the test to the first bit in the next sequential byte of both the work and the data key areas as the two tests masks are identical in the packing method.

In step U, the contents of register 9 are shifted left logical one bit in order to move to the next sequential bit in a given byte when the comparison of step S indicated that all bits in the data key byte had not been worked. Here, we are merely moving over to the next bit in the same byte as previously worked for a new sensing operation.

In step V, we branch unconditionally to step F, which causes us to begin work on the next bit in the same byte as was previously being worked on a bit-by-bit basis in the data key.

In step W, register 11 is added to register 2 or more specifically, one is added to the work area address register 2 in order to shift to the next sequential byte in the work area.

In step X, register 11 is added to register 3 to add one to the data key area address register to move to work the next sequential byte in the data key.

In step Y, register 13 is compared logically with register 6 to determine whether or not we have reached the end of the data key. Register 6 contains the address of the end of the key and register 3 contains the address of the byte we are currently working in the key.

In step Z, we branch on condition to step E if the data key address is not equal to the end of the data key as determined in the comparison of step Y.

The steps AA through CC are merely wind-up operations to the packing method when we have reached the end of the data key. In step AA, the contents of register 7 are stored in the second byte of the instruction indicated as step BB below. As we are winding up the operation, we have a certain number of bits contained in the packing register which must be shifted left logically before their transfer to the storage area. This particular step indicates the extent of that shift or how many positions within the packing register we must shift to reduce the packing register bit counter to zero. This number is contained in the packing register bit counter as it always indicates the number of unused bits remaining in the packing register.

In step BB, the contents of register 12 are shifted left logically by the number of bits in the packing register bit counter.

In step CC, the contents of the packing register 12 are moved to an address in the storage area as indicated by register 5. The purpose of this step is simply to move the data which has been left justified in the packing register to the storage area in its compacted state. The register 5 as previously mentioned keeps track of the addresses within the storage area where the particular data is to be moved.

This concludes the packing method of a single unit, record or block within a data set. If it is desired to pack a second unit, record or block, the routine is again repeated and may be repeated as many times as is desired. The steps for transferring back to the beginning of the packing method have not been shown in FIG. 6 but are conventional in nature.

With the data set now contained in the storage area of the computer system in a compacted state, it is necessary to unpack the data when said data is transferred to a work area for processing by the computer system. The method of unpacking the data set contained in the storage area and its transfer to the work area is illustrated in FIG. 7.

In step A, the multiple registers 2 through 15 are loaded from the core storage address register 02 storage. Before beginning the unpacking method, the computer may have used the various general registers for other purposes and it is therefore necessary to establish these registers with the information which will be required during the packing method; therefore, in this step A, we are merely bringing information for core storage into the basic registers. The registers and their utilization are set forth in Table I.

In step B, register 33 is added to register 6. The purpose of this step is to add the high order or beginning byte address of the data key to a register which has a zero value.

In step C, register 4 is added to register 6. In this step, we are adding the length of the data key area in number of bytes to the address of the first byte of the data key in order to determine the address of the end of the key. As we proceed through the unpacking method, it will be necessary to constantly check the address that we are currently working in the data key to the end of the data key to determine when we have reached the end of the data key or when we have reached the address indicating the end of the data key in order to terminate the unpacking operation or move to the next unit, record or block in the data set and back to the first byte in the data key to repeat our operation.

In step D, the contents of register 8 are loaded into register 7. As the packing register may hold up to 32 bits, it is necessary to maintain a count as we proceed with the unpacking method of how many bits have been loaded into the packing register 12. In order to properly commence the method, it is necessary to indicate that no bits as yet have been placed in the packing register and this is accomplished by sending a value of 32 into the packing register bit counter. By subtracting one from the bit count register each time a bit is transferred to the packing register, we can determine how many bits have been placed in the packing register. When the register is full, the bit counter will have a value of zero.

In step E, the contents of register 10 are loaded into register 14. In referring back to the packing method, it will be noted that it was not necessary to keep track of the bit currently being worked in the store area. It was only necessary to keep track of the bits currently being worked in the work area and the key. In the unpacking method, however, it is necessary to keep track of the bit currently being worked in the storage area and in the key, but not in the work area. The purpose, therefore, in step E is to set the bit test mask for the storage area to the initial binary value of 1000 0000 which indicates the first bit in the byte is to be worked in the same manner as discussed in relation to step E in the packing method.

In step F, the contents of register 10 are loaded into register 9. This step in the unpacking method corresponds to step E in the packing method and is utilized to keep track of which bit in a particular byte is presently being worked in the data key by the establishment of a bit test mask for the data key.

In step G, we shift left logically one bit the particular contents of the packing register. This step sets the packing register so that it is ready to receive the next bit transferred to it. This shifting operation causes an "off" bit to move into the units position of the packing register. This "off" bit may then be left in its "off" condition or may be activated to an "on" position as required by the particular set of data in the storage area.

In step H, the contents of register 9 are loaded into the second byte of the instruction in step I. This step, in effect, places the bit test mask for the data key into step I so that the particular bit presently being worked in a particular byte in the data key can be indicated. Step H then tells the sensing means which bit in a particular byte to drive to effect a sensing of that bit.

In step I, the data contained at the storage address in register 3 is tested to determine whether the bit in the data key currently being worked is in an "on" or "off" condition to determine whether its corresponding bit in the data set is critical or superfluous. In this step, a condition code will be established which will be examined in step J below.

In step J, we branch on condition code to step V if the bit in the data key examined in step I was found to be in an "off" condition. This causes us to by-pass the transfer of data from the storage area to the work area when the key indicates a superfluous bit. If a critical bit is indicated by the examination of the data key, the steps K through U will be executed in order to effect a transfer of data from the storage area to the work area.

In step K, the contents of register 14 are stored in the instruction of step L which furnishes the current bit test mask for the storage area to the operation at step L.

In step L, the bit at the address in the storage area furnished by register 5 and the storage area bit test mask are tested under said mask to determine whether that particular bit in that particular byte is in an "on" or "off" condition. As a result of this test, the condition code is set.

In step M, we branch on condition code to step O if the bit examined in the storage area in step L was in an "off" condition and, therefore, by-pass step M which would energize the bit in the units position in the packing register to an "on" condition.

In step N, register 11 is added to register 12 or which, in effect, adds a one to the packing register 12 which places the bit in the units position of said packing register 12 in an "on" position.

In step O, we compare logically register 11 to register 14 or we compare the bit test mask for store to one to determine if we have worked the last bit in a particular byte.

In step P, we branch on condition code to step S if the last bit in a byte has been worked as indicated by the comparison of the bit test mask for store to one as described in step O.

In step Q, the contents of register 14 are shifted right logically one bit. The register 14 contains the bit test mask for store; therefore, this operation or step moves us to the next bit in the byte currently being worked in the store area. It should be noted that this operation is by-passed if a superfluous bit is indicated by the data key sensing as the data set in the storage area is compacted and superfluous bits have been removed in the packing operation.

In step R, we branch unconditionally to step W to determine whether or not the packing register is presently full.

In step S, register 11 is added to register 5 which, in effect, adds one to the address register for the storage area. This will cause us to move over and work the next sequential byte in the storage area if we last worked the last bit in the previous byte.

In step T, the contents of register 10 are loaded into register 14 in order to set the bit test mask for the storage area to its initial value or, in effect, to establish the condition whereby we might test the first bit in the next byte to be worked.

In step U, we branch unconditionally to step W to check the condition of the packing register to determine whether or not said register has 32 bits stored therein and is full.

In step V, register 11 is added to register 12 in order to add one to the packing register. In this step, we are adding or replacing or filling a missing or superfluous bit in the data set which had been extracted during the packing method. It should be noted at this point that for the purpose of illustration, an "on" bit has been placed in the units position of the packing register 12. Depending upon the nature of the data, either an "on" or an "off" bit may be superfluous and might be inserted at this particular point. If an "off" bit is to be inserted as described in the unpacking method previously described, the packing register 12 would simply be shifted one position as the bit in the units position is already in an "off" condition.

In step W, subtract register 11 from register 7 or subtract one from the packing register bit counter so that we might maintain our position count in said packing register 12. During this subtraction, we test for a zero condition and set a condition indicator.

In step X, we branch on condition to step BB if the packing register bit counter does not indicate zero. This branching operation by-passes the transfer of the data contained in the packing register 12 to the work area. If the packing register bit counter had been zero, it would have indicated that the packing register 12 was full and a transfer of the unpacked data from the packing register 12 to the work area would have commenced by means of steps Y through AA.

In step Y, the contents of register 12 are stored in the work area at an address indicated by register 2. This step moves the data in its unpacking state from the packing register to an address in the work area.

In step Z, register 13 is added to register 2 or four bytes are added to the work area address register which simply establishes the work area for its next transfer of data from the packing register 12 by establishing the new work area address to which the subsequent loading will be transferred.

In step AA, the contents of register 8 are loaded into register 7. This step resets the packing register bit counter to an initial value of 32 which, in effect, indicates that none of the bits currently in the register 12 are pertinent to our operation.

In step BB, register 11 is compared logically to register 9. Register 11 has a value of one which is equal to register 9, which holds the bit test mask for key, to determine if the last bit in a particular byte of the data key has been worked. If the two registers compare, the last bit in a particular byte has been worked and we move on to the next byte in the data key.

In step CC, we branch on condition code to step FF if the bit test mask for the data key is equal to register 11 to move us to the next byte in the data key.

In step DD, the contents of register 9, the bit test mask for the data key, is shifted right logically one bit which causes us to move to the next sequential bit in the data key.

In step EE, we branch unconditionally to step G to commence work on the next bit in the data key.

In step FF, register 11 is added to register 3. In this step, we are adding one to the data key address register which causes us to move to the next sequential byte in the data key.

In step GG, register 6 is compared logically to register 3. In this step, we are comparing the address of the end of the data key to the address of the byte currently being worked in the data key. This comparison will set a condition indicator which is to be tested in step HH.

In step HH, we branch on condition to step F if the data key area address register as tested in step GG was not equal to the end address of the data key. This step then transfers us back to begin work on the first bit in a new byte of the data key. If the comparison in step GG indicates that we are at the end of the data key, we are ready to wind up the unpacking method.

In step II, the contents of register 7 are transferred to the instruction of step JJ below. This transfer of data from the packing register bit counter 7 will inform the instruction at JJ as to how many unused bits are presently in the packing register as indicated by the packing register bit counter.

In step JJ, the contents of the packing register 12 are shifted left logically the number of bits which were contained in the packing register bit counter as supplied in step II. The purpose of this instruction is to left justify data in the packing register 12 before the transfer of that data to the work area.

In step KK, the contents of the packing register 12 are transferred to the address in the work area as indicated by register 2 and this completes the unpacking method of the set of data.

It should be noted at this point that the unpacking method described is for a single unit, record or block within a set of data and may be repeated as many times as is necessary to process all of the repetitive units, records or blocks within a particular set of data. To avoid confusion, however, the conventional operations for transferring back to the first step in the unpacking method have not been shown in FIG. 7.

It is to be understood that while I have illustrated and described one form of my invention, it is not to be limited to this specific form or arrangement of parts herein described and shown except insofar as such limitations are included in the claims.

What I claim and desire to secure by Letters Patent is:

1. A data transfer system for packing and unpacking data to remove and add respective bits which are not significant to uniquely represent a particular piece of data, said system comprising:

(a) a data key for a particular set of data made up of a plurality of bits, said key comprising a plurality of data retaining and identifying means which may be established in one of two physical states, one state indicating the bits of a set of data which are critical to uniquely identify the data in said set and a second state to indicate the superfluous bits in said data set, (b) a first area having data retaining means in which the set of data may be retained, (c) a second area having data retaining means to which the set of data may be transferred, (d) transfer means operatively connected to the data retaining means of the first and second areas to effect a transfer of the data between said areas, (e) means operatively connected to the data key to sense said key to determine the physical state of each of the data retaining and identifying means, (f) switching means operatively connected to the data key sensing means and the data transfer means to control the flow of data between the first and second areas in response to the signal received from the key data sensing means.

2. A data transfer system as recited in claim 1 wherein the data retaining and identifying means in the data key are comprised of a plurality of saturable magnetic cores which may be established in either an "on" or an "off" condition with one condition indicating critical bits in the data set and the second condition indicating superfluous bits in the data set.

3. A data transfer system as recited in claim 1 wherein the data key sensing means is comprised of a plurality of reading amplifiers operatively connected to a plurality of data flow circuits which convey the sensed condition of the data retaining and identifying means to the switching means.

4. A data transfer system as recited in claim 1 wherein the switching circuit is comprised of a plurality of switching means and control circuits to effect the control of the transfer of data between the first and second areas and to pack or unpack the set of data in accordance with the signal received from the data key sensing means.

5. A data transfer system as recited in claim 1 wherein the data transfer means includes an addressing means and a control means operatively connected to the retaining means of each of the first and second areas and wherein the switching means contains a control circuit means to each of said addressing and control means to control the transfer of data between the first and second areas to effect a packing and unpacking of the data set in accordance with the sensed condition of the data key.

6. A data transfer system comprising:

(a) first data means for storing a plurality of bits in one of two physical states in unpacked groups, each of said unpacked groups having a predetermined number of bits including correspondingly positioned bits which are necessary and correspondingly positioned bits which are superfluous for representing a piece of data, (b) second data means for retaining a plurality of bits in one of two physical states in a key group having a number of bits corresponding to the number in said unpacked groups, said bits in said key group being in one of said physical states in positions corresponding to said unpacked group necessary bits and in the other of said physical states in at least some of the positions corresponding to said unpacked group superfluous bits, (c) third data means for receiving a plurality of bits in one of two physical states in packed groups each having a predetermined number of bits less than in said respective unpacked groups by a number not greater than the number of superfluous bits in each of said unpacked groups, and (d) data transfer and control means coupled to said first, second and third data means and responsive to the condition of the bits in said key group to transfer to said third data means signals related to the condition of the bits in said unpacked groups which correspond in position to the bits in said key group which are in said one physical state, and blocking the transfer of such signals related to the condition of the bits in said unpacked groups which correspond in position to the bits in said key groups which are in said other physical state, thereby reducing the quantity of bits in said respective packed groups to a number less than the number in said unpacked groups without reducing said piece of data.

7. A data transfer system comprising:

(a) first data means for receiving a plurality of bits in one of two physical states in unpacked groups each having a predetermined number of bits including correspondingly positioned bits which are necessary and correspondingly positioned bits which are superfluous for representing a piece of data, (b) second data means for retaining a plurality of bits in one of two physical states in a key group having a number of bits corresponding to the number in said unpacked groups, said bits in said key group being in one of said physical states at least in positions corresponding to said unpacked group necessary bits and in the other of said physical states in at least some of the position corresponding to said unpacked group superfluous bits, (c) third data means for storing a plurality of bits in one of two physical states in packed groups each having a predetermined number of bits less than in said respective unpacked groups by a number not greater than the number of superfluous bits in each of said unpacked groups, and (d) data transfer and control means coupled to said first, second and third data means and responsive to the condition of the bits in said key group to transfer to said first data means signals for producing bits of one of said physical states where bits in said key group have no corresponding bits in said packed group, and transfer signals for producing bits related to the condition of the respective bits in said packed groups where such packed group bits correspond in position to bits in said key group, thereby adding to the quantity of bits in said unpacked groups by a number equal to the difference between the number of bits in said packed groups and said key groups.

References Cited

UNITED STATES PATENTS

| | | | |
|---|---|---|---|
| 3,289,169 | 11/1966 | Mardsz | 340—172.5 |
| 3,278,907 | 10/1966 | Barry et al. | 340—172.5 |
| 3,238,298 | 3/1966 | Willis | 178—50 |
| 3,200,378 | 10/1965 | King | 340—172.5 |
| 3,111,648 | 11/1963 | Marsh et al. | 340—172.5 |
| 3,107,342 | 10/1963 | Estrems et al. | 340—172.5 |
| 3,185,823 | 5/1965 | Ellersick et al. | 235—154 |
| 3,064,239 | 11/1962 | Svigals et al. | 340—172.5 |

PAUL J. HENON, *Primary Examiner.*

G. SHAW, *Assistant Examiner.*